US010444064B2

(12) United States Patent
Bartling et al.

(10) Patent No.: US 10,444,064 B2
(45) Date of Patent: Oct. 15, 2019

(54) MONITORING A GEOLOGICAL FORMATION

(71) Applicant: OPTASENSE HOLDINGS LIMITED, Farnborough, Hampshire (GB)

(72) Inventors: William Bartling, Farnborough (GB); Alastair Godfrey, Farnborough (GB)

(73) Assignee: Optasense Holdings Limited (GB)

( * ) Notice: Subject to any disclaimer, the term of this patent is extended or adjusted under 35 U.S.C. 154(b) by 0 days.

(21) Appl. No.: 15/487,658

(22) Filed: Apr. 14, 2017

(65) Prior Publication Data
US 2017/0315261 A1 Nov. 2, 2017

Related U.S. Application Data

(60) Provisional application No. 62/329,355, filed on Apr. 29, 2016.

(51) Int. Cl.
*G01H 9/00* (2006.01)

(52) U.S. Cl.
CPC ..... *G01H 9/004* (2013.01); *G01V 2210/1429* (2013.01)

(58) Field of Classification Search
CPC . G01V 8/16; G01V 5/04; G01V 11/00; G01V 2210/1429; G01N 27/403; G01H 9/004
USPC ..................................................... 250/269.1
See application file for complete search history.

(56) References Cited

U.S. PATENT DOCUMENTS

| 4,851,659 A * | 7/1989 | Dillon | H01J 31/24 250/214 VT |
| 2006/0152383 A1* | 7/2006 | Yamate | E21B 47/123 340/853.1 |
| 2012/0160680 A1* | 6/2012 | Fan | B01L 3/502792 204/451 |
| 2015/0115166 A1* | 4/2015 | Godfrey | G01H 9/004 250/374 |
| 2017/0146685 A1* | 5/2017 | Choi | E21B 47/0905 |

(Continued)

FOREIGN PATENT DOCUMENTS

| WO | WO2012/082488 | 12/2011 |
| WO | WO2013/032687 | 8/2012 |
| WO | WO2013/171460 | 5/2013 |

*Primary Examiner* — David P Porta
*Assistant Examiner* — Gisselle Gutierrez
(74) *Attorney, Agent, or Firm* — McDonnell Boehnen Hulbert & Berghoff LLP

(57) ABSTRACT

This application relates to methods and apparatus for monitoring a geological formation that is or has been subjected to steam injection using a distributed fiber optic sensor apparatus to perform distributed fiber optic sensing on an optical fiber deployed in a borehole running through the geological formation to acquire a first set of measurement signals being indicative of disturbances acting on each of a plurality of longitudinal sensing portions of the first optical fiber where at least part of the optical fiber is disposed adjacent to at least a first electrode spaced apart from a second electrode and the first and second electrode are separated by a void that is filled with a gas and an electrical source applies a potential difference to the first and second electrodes such that an ionization event within the gas results in an avalanche multiplication.

22 Claims, 2 Drawing Sheets

(56) References Cited

U.S. PATENT DOCUMENTS

2017/0227665 A1* 8/2017 Wilson ..................... G01V 3/12
2017/0260488 A1* 9/2017 Costa ..................... C12M 21/08

* cited by examiner

Figure 3
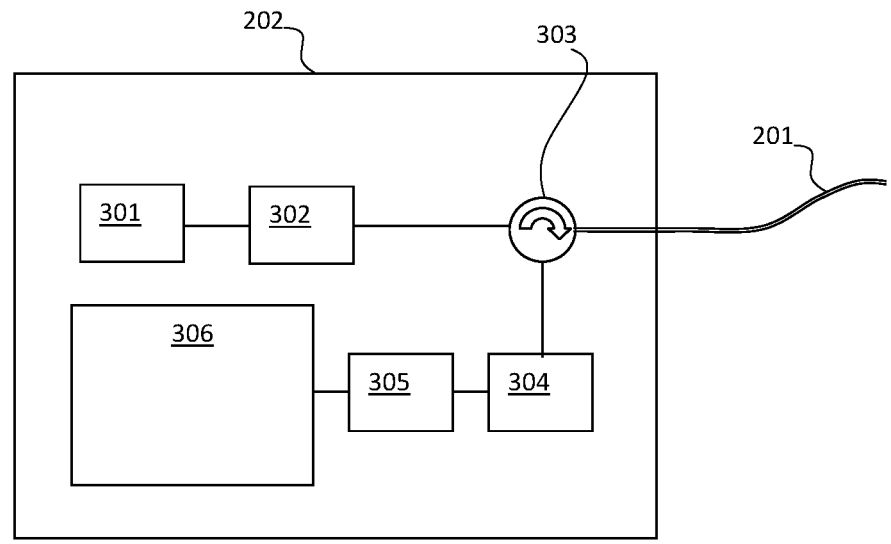
Figure 3
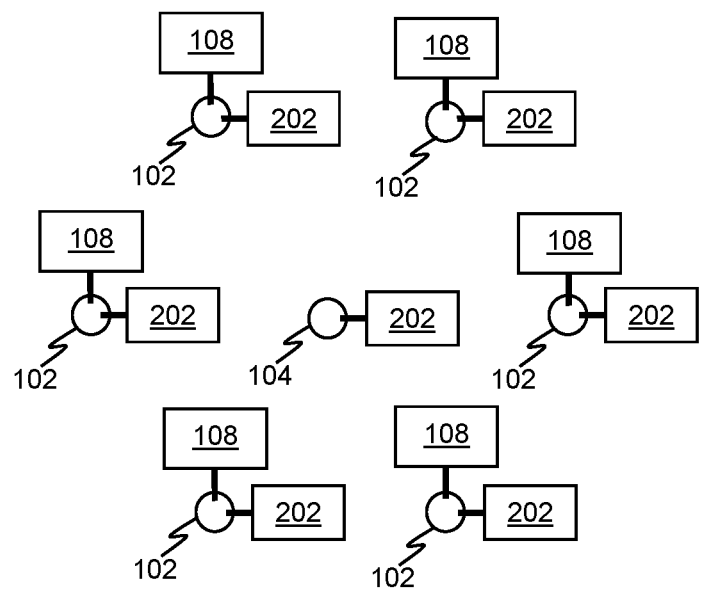
Figure 4

MONITORING A GEOLOGICAL FORMATION

FIELD OF THE INVENTION

The present invention relates to methods and apparatus for monitoring a geological formation subjected to steam injection, and in particular to monitoring such a geological formation using an optical fibre.

BACKGROUND

Steam injection is sometimes used to extract hydrocarbon deposits such as viscous oil or bitumen deposits from hydrocarbon wells. The steam heats the deposit, lowering the viscosity and making it easier and more efficient to extract. The steam may be injected into the hydrocarbon field or reservoir through an 'injection' well shaft and the deposit is removed via a 'production' well shaft.

There are various known steam stimulation techniques. For example, Steam Assisted Gravity Draining (SAGD) is one type of technique for stimulation of a reservoir. Two boreholes are drilled with horizontal sections passing through the reservoir region to provide an upper shaft running generally above a lower shaft. Steam is injected through the upper shaft (and also, in some wells, initially through the lower shaft) causing the resource to heat up, liquefy and drain down into the area of the lower 'production' shaft, from which it is removed.

Other related techniques are 'steam flooding' (also known as 'continuous steam injection'), in which steam is introduced into the reservoir through (usually) several injection well shafts, lowing the viscosity, and also, as the steam condenses to water, driving the oil towards a production well shaft. In some instances there may be multiple well bores arranged in a desired pattern, e.g. a generally hexagonal arrangement of vertical steam injection wells surrounding a producing well in the middle. In a variant of this, so-called cyclic steam injection, the same shaft may function both as an injection well shaft and as a production well shaft. First, steam is introduced (this stage can continue for a number of weeks), then the well is shut in, or sealed, allowing the steam to condense and transfer its heat to the deposit. Next, the well is re-opened and oil is extracted until production slows down as the oil cools. The process may then be repeated.

In some instances steam injection techniques may be applied to existing wells that were not originally steam assisted to improve and/or maintain production beyond which could be achieved in the absence of steam stimulation.

Steam injection may be achieved in various ways depending on the type of well and steam assistance being employed. For example some conventional steam injection well shaft casings typically include a long slot from which the steam is released in order to achieve even heating of the reservoir. However, as the steam tends to follow the path of least resistance, heating can be localised. This means that the so-called 'steam cavern' or 'steam chamber' formed could be irregular in shape, leading to inefficient production and the risk of 'steam breakthrough' whereby steam finds its way to the production well, mixing with the oil as it is extracted.

More recently injection well casings have been designed with a number of discrete vents with slide valves rather than single long slots. Examples are described in WO2012/082488 and WO2013/032687. Such valves may be selectively controlled, based for example on an estimation of the shape of the steam chamber, to try to improve the shape by selective injection of steam along the length of an injection well shaft.

For the various steam assisted approaches it would be beneficial to be able to monitor the characteristics of the steam injection. This may be useful simply for providing information about the overall effect on the reservoir but in some applications it may be possible to control the steam injection, i.e. vary the overall flow rate or pressure or selectively control individual valves along the length of the injection well so as to achieve a desired profile.

SUMMARY OF THE EMBODIMENTS

Embodiments of the present invention therefore relate to methods and apparatus for monitoring a geological formation subjected to steam injection.

Thus according to the present invention there is provided a method of monitoring a geological formation subjected to steam injection, the method comprising:
  performing distributed fibre optic sensing on a first optical fibre deployed in a borehole running through the geological formation to acquire a first set of measurement signals being indicative of disturbances acting on each of a plurality of longitudinal sensing portions of the first optical fibre;
  wherein at least part of the first optical fibre is disposed adjacent to at least a first electrode spaced apart from a second electrode, with a gas between the first and second electrodes and wherein the potential difference between the first and second electrodes is such that an ionisation event within the gas results in an avalanche multiplication;
  the method further comprising analysing the first set of measurement signals to determine a spatial distribution of radioactive sources throughout the geological formation.

Analysing the first set of measurement signals may comprise identifying signals characteristic of avalanche multiplication in the gas between the first and second electrodes. The method may further comprise mapping the distribution and/or concentration of steam and/or condensed steam in the geological formation, based on the spatial distribution of radioactive sources.

The method may involve determining a change in the distribution of radioactive sources over time.

In some embodiments the concentration and/or the inflow or outflow of the steam and/or condensed steam may be analysed based on the spatial distribution of radioactive sources to determine areas of steam penetration or areas where there is a lack of steam penetration in the geological formation.

The method may also comprise acquiring background noise signal by performing distributed fibre optical sensing when the potential difference between the electrodes is not sufficient to cause avalanche multiplication in response to an ionisation event. Additionally or alternatively a background noise signal may be acquired by performing distributed fibre optical sensing on a second sensing optical fibre which is spaced apart from the first and second electrodes so as to be substantially insensitive to any avalanche multiplication. The method may comprise subtracting the background noise signal from the first set of measurements.

In some instance the method may comprise:
  performing distributed fibre optic sensing on a second optical fibre deployed in a borehole running through the geological formation to acquire a second set of measurement signals being indicative of disturbances acting on each of a plurality of longitudinal sensing portions of the first optical fibre;

wherein at least part of the second optical fibre is disposed adjacent to at least a third electrode spaced apart from a fourth electrode, with a gas between the third and fourth electrodes and wherein the potential difference between the third and fourth electrodes is such that an ionisation event within the gas results in an avalanche multiplication; and analysing both the first and second set of measurement signals to determine a spatial distribution of radioactive sources throughout the geological formation.

The first and second optical fibres may be located in different areas of the geological formation. The step of analysing the first and second sets of measurement signals may involve building a three dimensional map or model of the steam and or condensed steam in the geological formation.

The method may comprise the step of determining the spatial distribution of radioactive sources whilst steam is being injected and controlling at least one parameter of steam injection based on the determined spatial distribution of radioactive sources.

The method may comprise the step of determining the spatial distribution of radioactive sources whilst product is produced from the wellbore.

The geological formation may be subjected to at least one of: steam assisted gravity draining; steam flooding; continuous steam injection; and cyclic steam injection.

Aspects also relate to an apparatus for monitoring a geological formation subjected to steam injection. The apparatus may comprise:

a fibre optic cable structure comprising a first optical fibre disposed adjacent first and second electrodes, the first and second electrodes being separated by a gas;

a distributed fibre optic sensor interrogator unit configured to, in use, perform distributed fibre optic sensing on the first optical fibre when the fibre optic cable structure is deployed in a borehole running through the geological formation to acquire a first set of measurement signals being indicative of disturbances acting on each of a plurality of longitudinal sensing portions of the first optical fibre;

an electrical source for generating a potential difference between the first and second electrodes such that an ionisation event within the gas results in an avalanche multiplication; and a processor configured to analyse the first set of measurement signals to determine a spatial distribution of radioactive sources throughout the geological formation.

The apparatus may be used to implement any of the variants of the method described above. For example the processor may be configured to analyse the first set of measurement signals to identify signals characteristic of avalanche multiplication in the gas between the first and second electrodes. The processor may be further configured to map the distribution and/or concentration of steam and/or condensed steam in the geological formation, based on the spatial distribution of radioactive sources. The processor may be further configured to determine a change in the distribution of radioactive sources over time.

The processor may be configured to analyse the concentration and/or the inflow or outflow of the steam and/or condensed steam based on the spatial distribution of radioactive sources to determine areas of steam penetration or areas where there is a lack of steam penetration in the geological formation.

The apparatus may be operable in a background noise measurement mode. In the background noise measurement mode the distributed fibre optic sensor interrogator unit may be configured to perform distributed fibre optic sensing on the first optical fibre during a period when the electrical source is configured to operate such that the potential difference between the first and second electrodes is not sufficient to cause avalanche multiplication in response to an ionisation event so as to generate a background noise signal.

The apparatus may further comprising a second sensing optical fibre which is spaced apart from the first and second electrodes so as to be substantially insensitive to any avalanche multiplication and wherein the apparatus is configured to perform distributed fibre optic sensing on the second optical fibre to provide a background noise signal. The distributed fibre optic sensor interrogator unit may be configured to perform distributed fibre optic sensing on both the first and second optical fibres, or there may be a respective distributed fibre optic sensor interrogator unit for each of the first and second optical fibres.

The processor may be configured to subtract the background noise signal from the first set of measurements.

Aspects also relate to the processing of data acquired by distributed fibre optic sensing. In another aspect therefore there is provided a method of determining information about a geological formation subjected to steam injection, the method comprising:

accessing a first set of measurement signals, the first set of measurement signals having been acquired by performing distributed fibre optic sensing on a first optical fibre deployed in a borehole running through the geological formation and being indicative of disturbances acting on each of a plurality of longitudinal sensing portions of the first optical fibre;

wherein at least part of the first optical fibre was disposed adjacent to at least a first electrode spaced apart from a second electrode, with a gas between the first and second electrodes and wherein the potential difference between the first and second electrodes is such that an ionisation event within the gas results in an avalanche multiplication;

the method further comprising analysing the first set of measurement signals to determine a spatial distribution of radioactive sources throughout the geological formation.

BRIEF DESCRIPTION OF THE DRAWINGS

The invention will now be described in more detail by way of example only with respect to the accompanying drawings, of which:

FIG. 3 shows an example of distributed acoustic sensing interrogator unit; and

FIG. 4 shows a multi-well pattern.

DETAILED DESCRIPTION

Figure 1:
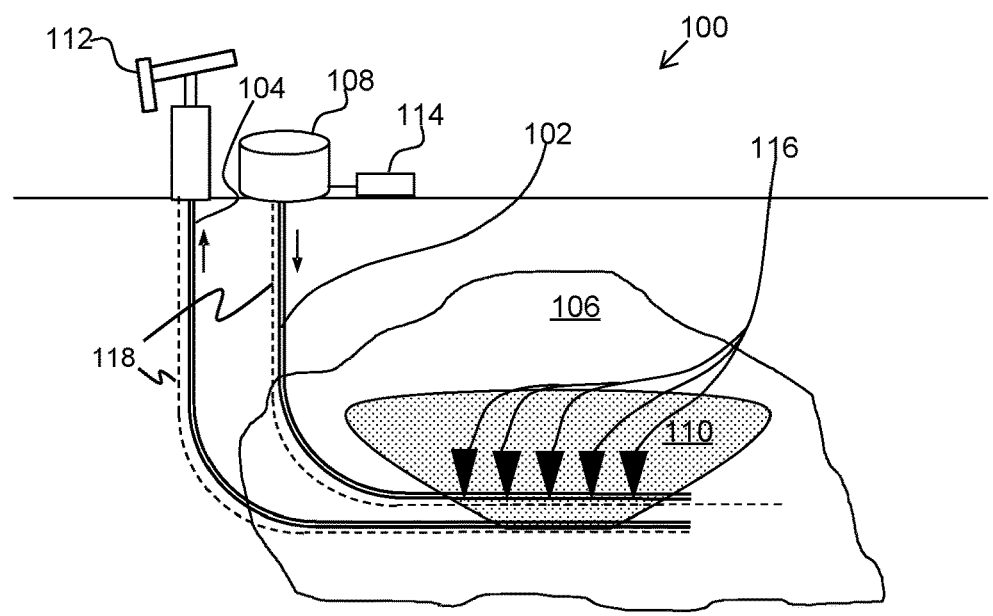
FIG. 1 shows an example of a steam assisted gravity drainage well.

In various well completions steam may be injected into the well at some point during the lifetime of the well in order to improve yield. FIG. 1 shows one example of a Steam Assisted Gravity Drainage (SAGD) well 100.

As will be familiar to the skilled person, a SAGD well 100 is typically formed by drilling at least two bore holes, one to serve as an 'injection' shaft 102 and another as a 'production' shaft 104. Both bore holes may be arranged to have substantially horizontal portions, with the horizontal injection shaft 102 being arranged a few meters above the production shaft 104 but generally substantially parallel thereto. Both horizontal shaft portions are drilled so as to run through an underground resource reservoir 106, which in the case of a SAGD well 100 is typically a viscous oil or bitumen reservoir (the term 'oil' as used herein should be understood as including all such resources).

In use of the SAGD well 100, a steam generator 108 is used to generate steam which is released into the reservoir 106 from the horizontal portion of the injection shaft 102. This steam penetrates the reservoir 106 and heats the oil within the reservoir, decreasing its viscosity. Over time, the steam typically forms a steam chamber 110, and results in the heated oil flowing to the horizontal portion of the production shaft 104. The production shaft 104 collects the oil, which may for example be pumped to the surface by pumping apparatus 112. The apparatus further comprises a controller 114 in association with the injection shaft 102. In some embodiments this controller 114 may be arranged to control valves within the injection shaft 102 to selectively control the release steam therefrom. In FIG. 1 five individual valves producing five distinct plumes of steam 116 into the chamber 110 are illustrated. However, it will be appreciated that a real system could be several kilometers in length and there may be many more valves provided.

As will be familiar to the skilled person, while the arrangement above is fairly typical, variations are known, such as also using the production shaft 104 to introduce steam, at least in the initial stages of heating. Other similar schemes which use steam to heat a reservoir are also known, including Cyclic Steam Stimulation, in which one shaft is used alternately as a production shaft and an injection shaft, and steam flooding, in which oil is both heated by steam released form one or more injection shafts, and urged towards a production well. Any such methods could benefit from the use of the general principles described herein, and constitute methods of steam stimulation which may be employed in steam stimulated wells.

In order to allow efficient steam injection and to ensure that steam is delivered in the desired manner, for instance to ensure a desired shape of steam cavity or the like, it would be beneficial to be able to be able to monitor a geological formation subjected to steam injection and monitor the distribution of steam in the geological formation.

Embodiments of the present invention make use of distributed fibre optic sensing which is sensitive to ionising radiation to provide monitoring of a geological formation subjected to steam injection by monitoring the distribution of radioactive sources within the geological formation.

In one embodiment a method of monitoring a geological formation subjected to steam injection may comprise acquiring a first set of measurement signals by performing distributed fibre optic sensing on a first optical fibre deployed in a borehole running through the geological formation wherein at least part of the first optical fibre is adjacent to a first electrode spaced apart from a second electrode with a gas between the first and second electrodes, where the potential difference between the first and second electrodes is near to but lower than the breakdown voltage of the relevant gas. Such an arrangement results in a distributed fibre optic sensor apparatus that is sensitive to ionising radiation. The potential different applied between the electrodes is below the breakdown voltage of the gas and thus is insufficient to cause any current flow between the electrodes. However the potential difference is high enough such that an ionisation event within the gas, e.g. formation of one or more ionised atoms/molecules of the gas, results in avalanche multiplication within the gas, resulting in an avalanche or electrons, e.g. a spark. When the gas sparks, an acoustic/pressure wave is also produced and this acoustic wave can be detected using the techniques of distributed acoustic sensing (DAS) with the first optical fibre.

Figure 2:
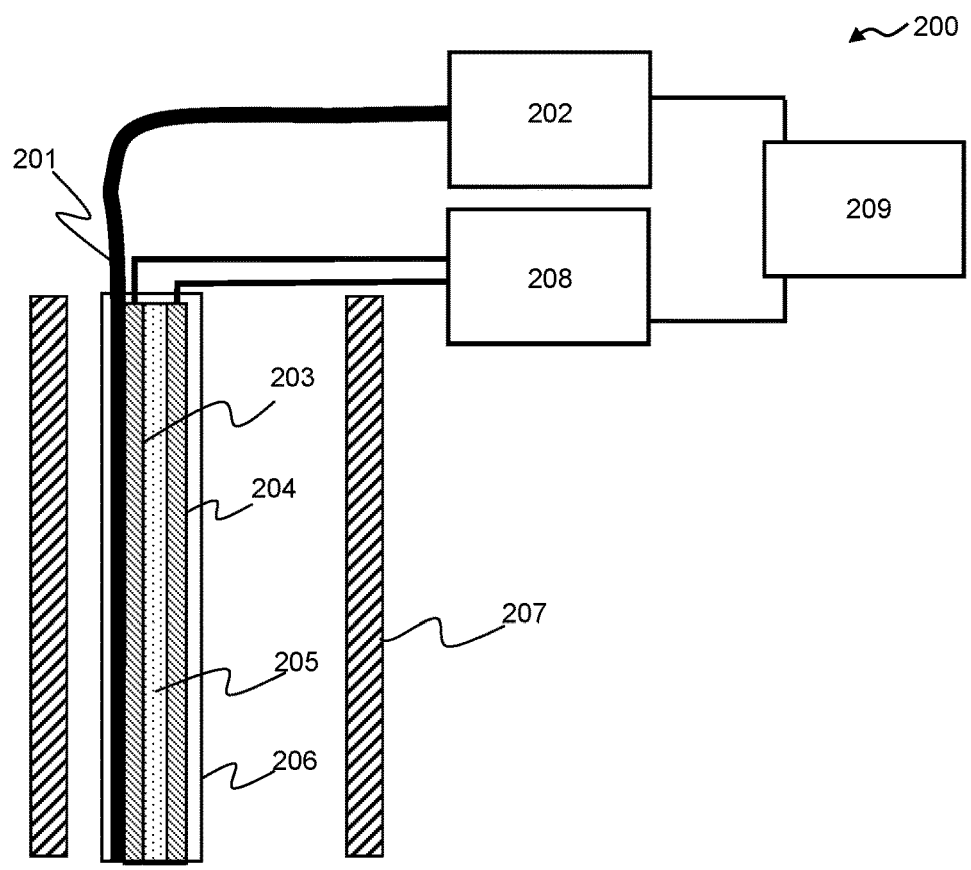
FIG. 2 illustrates a distributed fibre optic sensor apparatus sensitive to ionising radiation.

FIG. 2 illustrates one example of a suitable distributed fibre optic sensing apparatus 200 that is sensitive to ionising radiation.

A suitable distributed fibre optic sensing apparatus that is sensitive to ionising radiation is described in PCT/GB2013/051207, the content of which is hereby incorporated by reference to the fullest extent allowable. A simplified example of a suitable distributed fibre optic sensing apparatus 200 is illustrated in FIG. 2. It should be noted that only the basic components necessary to illustrate the invention are described with reference FIG. 2, and many variations will be possible, including variants described in PCT/GB2013/051207.

FIG. 2 illustrates that the apparatus comprises a sensing optical fibre 201 which is coupled to an interrogator unit 202 for distributed acoustic sensing, which will be described in more detail below with respect to FIG. 3. The sensing optical fibre is deployed to be generally adjacent first electrode 203 and second electrode 204. The first and second electrode are separated from one another to form a gas filled gap or void 205. The first and second electrodes 203 and 204 are elongate conductors and may run adjacent the sensing optical fibre 201 for a significant part of its length. The first and second electrodes 203 and 204 may be contained with the optical fibre 201 in a cable structure 206. In use the cable structure 206 is deployed in an area of interest, which in embodiments of the present invention will be within a borehole 207, at least part of which runs through a geological formation of interest which is subjected to steam injection. In some instances such a sensing apparatus may be deployed so that the cable structure is deployed within the injection well and thus borehole 207 may be the injection well shaft 102. Additionally or alternatively in some instances a sensing apparatus may be deployed so that the cable structure is deployed within the production well and thus borehole 207 may be the production well shaft 104. Possible sites for installation for the apparatus are indicated by the dashed lines 118 in FIG. 1 In some instances however the bore hole 207 may be a separate observation borehole or the borehole of some other existing well, whether or not sensing is also performed in one or both of the production and injection well.

The first and second electrodes 203 and 204 are electrically coupled to a voltage source 208 that applies a predetermined potential difference between the electrodes 203 and 204. A processor 209 may receive and process the resulting data from the DAS interrogator unit 202 and optionally may control the voltage source 208.

As mentioned the optical fibre 201 is optically coupled to a distributed acoustic sensing (DAS) interrogator unit 202. The optical fibre 201 may be coupled directly or indirectly, i.e. via some intermediate connection, to an output/input of the interrogator unit 202 using conventional fibre optic coupling means. FIG. 3 illustrates in simplified form the structure and operation of a suitable DAS interrogator unit 202. DAS techniques will be familiar to those skilled in the art and are therefore only briefly outlined here The interrogator unit is arranged to launch coherent electromagnetic radiation into the optical fibre 101 and to detect any radiation from said pulses which is backscattered within the optical fibre. By processing the detected backscattered radiation information about environmental disturbances acting on portions of the sensing optical fibre can be determined.

To generate the coherent interrogating radiation, the interrogator unit 202 comprises at least one optical source 301, such as a laser. The output of the laser 301 may be received by a modulator 302 to provide a particular format of interrogating radiation. The interrogating radiation output from the modulator 302 is then transmitted into the optical fibre 201, for instance via a circulator 303.

Suitable formats or patterns of interrogating radiation include, but are not limited to, one or more pulses of coherent optical radiation. In one form of DAS sensor each interrogation involves launching two spatially separate pulses of optical radiation at different frequencies into the sensing fibre. Note that as used herein the term optical radiation is not restricted to electromagnetic radiation in the visible part of the spectrum and for the avoidance of doubt the term optical may comprise visible radiation, infrared radiation, ultraviolet radiation and radiation in other regions of the electromagnetic spectrum. The term light should be construed in the same way. In use the interrogator unit repeatedly interrogates the sensing optical fibre with interrogating optical radiation and detects the backscatter from the fibre from each interrogation.

Radiation which is backscattered from the interrogating radiation propagating within the optical fibre is directed to at least one photodetector 304, again for instance via the circulator 303. The detector output is sampled by an analogue to digital converter (ADC) 305 and the samples from the ADC are passed to processing circuitry 306 for processing. The processing circuitry 306 processes the detected backscatter in a plurality of time bins or channels, each time bin or channel corresponding to a different longitudinal sensing portion of interest of optical fibre 201.

The processing basically determines some properties of the backscattered radiation for the relevant sensing portion. In the absence of any environmental stimuli acting on the sensing fibre then the response for any given sensing portion would be the same for each interrogation, assuming the same interrogating optical radiation was used. However environmental disturbances acting on the relevant sensing portion of fibre, such an incident pressure/acoustic waves, may induce a change in effective optical path length of that portion which, as the backscatter signal is an interference signal, will alter the backscatter properties. Such a variation can be detected and used to provide a measurement signal indicative of a disturbance affecting the relevant sensing portion.

It will be noted that the interrogator unit 202 may comprise various other components such as amplifiers, attenuators, additional filters, noise compensators, etc. but such components have been omitted in FIG. 3 for clarity.

Referring back to FIG. 2, in use the voltage source applies a potential difference between the first and second electrodes 203 and 204. The voltage applied is chosen to be relatively high but below the breakdown voltage of the gas in the void or cavity 205. In some instances the gas within cavity 205 may be air but in some instances as the cavity may be sealed within cable structure 206 a different gas with desired breakdown properties may be used.

The potential difference applied is insufficient, on its own, to cause the gas to break down and a current discharge to occur between the electrodes. However it is sufficient such that if an ionisation event occurs, e.g. an atom or molecule of the gas is ionised by incident ionising radiation, then the acceleration of the resulting ions results in avalanche multiplication within the gas at that point. Thus following an ionisation event a short duration current discharge occurs, i.e. there is a spark between the electrodes. This creates both an acoustic pressure wave and localised heating, both of which can result in a detectable disturbance on the sensing optical fibre that is detected by the interrogator unit 202.

The measurement signal generated by the distributed fibre optic sensor apparatus 200 thus correspond to signals from each of a plurality of longitudinal sensing portions of the first optical fibre, the measurement signals being indicative of disturbances acting on said sensing portion which, in this, case, is indicative of the number of ionisation events induced within the gas at that sensing portion and hence indicative of the intensity of ionising radiation incident at said sensing portion.

The measurement signals can thus be analysed by processor 209 to determine the relative intensity of ionising radiation/concentration of radioactive sources along the path of the sensing fibre through the geological formation. Such information can provide information about how the steam has penetrated the formation, e.g. the reservoir, and in particular any flow paths within the reservoir. In particular the method may comprise monitoring for how the distribution of radioactive sources changes over time during and/or following steam injection.

The radioactive source may be sources that are already present in the reservoir and/or in some embodiments at least some of the radioactive sources could correspond to radioactive tracers deliberately added to the injected steam.

When steam is injected into a well, naturally occurring radioactive materials (NORM) present in the surrounding geological formation may be displaced by the steam, for instance leeched from the surrounding formation by the steam or condensed water resulting from the steam detection. Such NORM particles will emit ionising radiation as they decay (e.g. alpha, beta and/or gamma radiation depending on the isotope and decay mechanism). As mentioned such ionising radiation, in particular gamma radiation, can be detected by the distributed fibre optic sensor Examples of NORM particles that might give rise to gamma radiation include uranium, thorium and potassium and their decay products such as radium and radon. These radioactive elements are naturally occurring in low concentrations in geological formations and dissolve in both steam and hydrocarbon deposits in the well.

The distribution of radioactive sources and especially how the distribution of radioactive sources changes over time can thus provide information about how the steam is penetrating into the formation and/or how the condensed steam flow/settles within the formation.

In some embodiments however at least some of the radioactive sources may be particles of radioactive material that are deliberately added to the steam. The addition of radioactive tracer materials has been proposed previously to track steam migration. However measuring the tracer movement requires point radiation detector such a Geiger counters to be introduced into an observation wellbore and such methods are principally used to track the time between releasing the tracers into the steam flow and a detectable increase in radioactivity at the point sensor. Such approaches do not allow information to be obtained about the spatial distribution of radioactive sources throughout the geological formation.

A method according to an embodiment of the present invention may therefore comprise analysing the acoustic signals detected to identify those caused by avalanche multiplication in the gas between the first and second electrodes, due to ionising radiation, i.e. identifying acoustic signals that correspond to sparking between the electrodes. This may involve analysing the signal to extract acoustic signals with a profile characteristic of the acoustic profile of sound waves associated with avalanche multiplication, e.g. a spark. It may further comprise the removal of other acoustic signals (such as background noise). For example, the first set of measurements may further comprise one or more background level noise measurements taken whilst the potential difference is not applied to electrodes—and thus no spark would be created in the presence of ionising radiation. Thus in some embodiments the voltage source may be controlled so that periodically the potential difference between the electrodes is removed or reduce to a level insufficient to cause a current discharge, e.g. spark, in response to an ionisation event. During such periods DAS sensing may be applied to the sensing optical fibre to generate a general background noise signal. Additionally or alternatively a second sensing optical fibre may also run down the wellbore, but separated from the first and second electrodes so as to be relatively insensitive to any current discharges/sparks between the electrodes. DAS may be performed on this second sensing fibre so as to detect a background noise signal. The step of analysing the measurement signals may then comprise subtracting the background noise signal from the first set of measurements.

In any of the embodiments described below, the method may further comprise a calibration stage wherein the background level of radioactivity along the path of the sensing apparatus is measured before any steam is injected into the well, i.e. a baseline measure of the distribution of NORM radioactive sources may be determined. The method may further comprise adjusting the number of ionisation events detected to take the normal background radiation level into account when determining the spatial distribution of radioactive sources.

The step of analysing the first set of measurement signals may comprise assuming one or more relationships between the number of ionisation events detected by analysing the acoustic signals and the underlying distribution of radioactive sources in the surrounding medium. Especially for naturally occurring radioactive sources an assumption may be made regarding the decay rate and decay process and thus for example the expected rate of gamma emissions from a certain volume of material or steam.

The method of sensing in effect provides a count of the number of ionising events detected by a particular sensing portion of the sensing optical fibre over time. The relationship between the number of ionising events detected and the distribution of the radioactive sources will depend on a number of factors, for instance the relative decay rates of the various sources and the offset of the sources from the particular sensing portion—as well as how likely it is that a particular decay will result in an ionisation event in the particular gas between the electrodes.

If in general however it is assumed that the radioactive sources within a geological formation have similar rates of decay and likelihood of causing an ionisation event—or the distribution of different types of sources is even throughout the formation, then it may be assumed that the effect of steam on the sources will be to concentrate the sources where the steam is concentrated or where the condensed steam is concentrated. This may in particular be a valid assumption where a radioactive tracer material is added to the steam such that tracer material is evenly dispersed in a given volume of steam. In this way it can be assumed that there is a direct relationship between the detected number of ionisation events and the spatial distribution of the radioactive sources.

In some examples, the method may comprise mapping the 2-dimensional distribution of steam along the length of the optical fibre by assuming a fixed ratio between the number of ionisation events detected and the concentration of steam. The method may further comprise mapping the spatial distribution of steam and/or condensed steam in the geological formation, using the spatial distribution of radioactive sources.

In some examples, the method may further comprise monitoring radioactive sources detected over time and determining a change in the number and/or distribution of radioactive sources. The method may further comprise mapping an inflow or outflow of steam and/or condensed steam using the change in the distribution of radioactive sources. For example, the concentration of radioactive sources may be expected to change in a defined way in areas with good steam penetration (e.g. naturally occurring sources may decrease in some areas if being 'washed away' by the steam and pool in other areas where the condensed steam collect and deliberately introduced tracer sources will increase the radioactivity in areas where the steam penetrates. The distribution of sources will be expected to remain substantially constant in areas where the steam does not penetrate.

In some examples, the method may comprise analysing the spatial distribution and/or the density and/or the inflow or outflow of the steam or condensed steam to determine areas of steam penetration or areas where there is a lack of steam penetration in the geological formation.

Such measurements of the steam distribution may be compared to a threshold distribution and dependent on whether the distribution falls within an appropriate range, the method may further comprise opening or closing one or more vents in the steam assisted well to modify the inflow of the steam into the geological formation. For example, vents may be closed in areas of good penetration in order to force steam to flow into areas where there is less steam.

The method may further comprise determining whether to change the pressure, temperature, quality, composition and/or density of steam injected into the geological formation. For example, the pressure may be increased if steam penetration remains stubbornly low in certain areas over time.

In a further embodiment, the method may comprise analysing two or more datasets, from separate optical fibre arrangements at different locations in order to build up a three dimensional picture of the radiation and thus steam distribution. Thus at least a second distributed fibre optic sensor apparatus having a second sensing optical fibre sensitised to ionising radiation may also be used.

The first and second optical fibres may be located in different areas of the geological formation, such as on opposite sides of a well, or in different wells that traverse different parts of the same hydrocarbon field.

For example FIG. 4 illustrates a plan view of at least part of a multi-well injection arrangement for steam injection. In the example illustrated in FIG. 4 at least one production wellbore 104 is arranged in a desired pattern with a number of injection wellbores 102 having steam generators 108 for steam injection. In this example the injection wells 102 are arranged in a hexagonal arrangement with the production well 104 at or towards the middle. A plurality of the wells may be provided with a DAS sensor, i.e. interrogator unit 202 and sensing optical fibre deployed down the well bore. In the example illustrated in FIG. 1 all seven wells are provided with fibre optic distributed acoustic sensors thus datasets from each wellbore can be generated.

The data sets may be combined to build up a three dimensional map. In such an example, the steps of analysing the first and second sets of measurement signals comprises building a three dimensional map of the steam and/or condensed steam in the geological formation, using the spatial distribution of radioactive sources in the first and second signals.

Advantages of the method described above include that the geological formation subjected to steam injection can be monitored down-well without disturbing hydrocarbon production. An indication of the effectiveness of steam injection can be gained in real time and thus the steam injection process can be modified, for instance by opening or closing one or more vents in the well.

It should be noted that whilst the present disclosure refers to steam injection, such steam injection can create a complex mixture of vapours and fluids inside the subsurface, e.g. within the formation, depending on the presence of various types of hydrocarbon and non-hydrocarbon materials. These materials can mix to various degrees with the various steam phases depending on the materials' solubility within the given vapour or fluid phase. The specific conditions of temperature, pressure, molecular weight, chemistry, pore space and other specific aspects in such vapour and fluid phases, can cause a preferential low or high concentration of radioactive material to occur in gaseous or condensed states. That particular radiation level can be sensed with the described distributed fibre optic sensor system. Any reference to monitoring steam within the formation thus refers to the mix of steam with subsurface materials and includes the complex mix of various phases.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The invention claimed is:

1. A method of monitoring a geological formation subjected to steam injection, the method comprising:
    performing distributed fibre optic sensing on a first optical fibre deployed in a borehole running through the geological formation to acquire a first set of measurement signals being indicative of disturbances acting on each of a plurality of longitudinal sensing portions of the first optical fibre;
    wherein at least part of the first optical fibre is disposed adjacent to at least a first electrode spaced apart from a second electrode, with a gas between the first and second electrodes and wherein the potential difference between the first and second electrodes is such that an ionisation event within the gas results in an avalanche multiplication;
    the method further comprising analysing the first set of measurement signals to determine a spatial distribution of radioactive sources throughout the geological formation.

2. A method as claimed in claim 1 wherein analysing the first set of measurement signals comprises identifying signals characteristic of avalanche multiplication in the gas between the first and second electrodes.

3. A method as in claim 1 further comprising mapping the distribution of steam and/or condensed steam in the geological formation, based on the spatial distribution of radioactive sources.

4. A method as in claim 1 further comprising determining a change in the distribution of radioactive sources over time.

5. A method as in claim 1 comprising analysing the concentration and/or the inflow or outflow of the steam and/or condensed steam based on the spatial distribution of radioactive sources to determine areas of steam penetration or areas where there is a lack of steam penetration in the geological formation.

6. A method as in claim 1 further comprising acquiring background noise signal by performing distributed fibre optical sensing when the potential difference between the electrodes is not sufficient to cause avalanche multiplication in response to an ionisation event and/or by performing distributed fibre optical sensing on a second sensing optical fibre which is spaced apart from the first and second electrodes so as to be substantially insensitive to any avalanche multiplication.

7. A method as in claim 6 wherein the method comprises subtracting the background noise signal from the first set of measurements.

8. A method as claimed in claim 1 further comprising:
    performing distributed fibre optic sensing on a second optical fibre deployed in a borehole running through the geological formation to acquire a second set of measurement signals being indicative of disturbances acting on each of a plurality of longitudinal sensing portions of the first optical fibre;
    wherein at least part of the second optical fibre is disposed adjacent to at least a third electrode spaced apart from a fourth electrode, with a gas between the third and fourth electrodes and wherein the potential difference between the third and fourth electrodes is such that an ionisation event within the gas results in an avalanche multiplication; and
    analysing both the first and second set of measurement signals to determine a spatial distribution of radioactive sources throughout the geological formation.

9. A method as claimed in claim 8 wherein the first and second optical fibres are located in different areas of the geological formation.

10. A method as claimed in claim 1 further comprising the step of determining the spatial distribution of radioactive sources whilst steam is being injected and controlling at least one parameter of steam injection based on the determined spatial distribution of radioactive sources.

11. A method as claimed in claim 1 further comprising the step of determining the spatial distribution of radioactive sources whilst product is produced from the wellbore.

12. An apparatus for monitoring a geological formation subjected to steam injection, the apparatus comprising:

a fibre optic cable structure comprising a first optical fibre disposed adjacent first and second electrodes, the first and second electrodes being separated by a gas;

a distributed fibre optic sensor interrogator unit configured to, in use, perform distributed fibre optic sensing on the first optical fibre when the fibre optic cable structure is deployed in a borehole running through the geological formation to acquire a first set of measurement signals being indicative of disturbances acting on each of a plurality of longitudinal sensing portions of the first optical fibre;

an electrical source for generating a potential difference between the first and second electrodes such that an ionisation event within the gas results in an avalanche multiplication; and a processor configured to analyse the first set of measurement signals to determine a spatial distribution of radioactive sources throughout the geological formation.

13. An apparatus as claimed in claim 12 wherein the processor is configured to analyse the first set of measurement signals to identify signals characteristic of avalanche multiplication in the gas between the first and second electrodes.

14. An apparatus as claimed in claim 12 wherein the processor is further configured to map the distribution of steam and/or condensed steam in the geological formation, based on the spatial distribution of radioactive sources.

15. An apparatus as claimed in claim 14 wherein the processor is further configured to map the concentration of steam and/or condensed steam in the geological formation, using the spatial distribution of radioactive sources.

16. An apparatus as claimed in claim 12 wherein the processor is further configured to determine a change in the distribution of radioactive sources over time.

17. An apparatus as claimed in claim 12 wherein the processor is further configured to analyse the concentration and/or the inflow or outflow of the steam and/or condensed steam based on the spatial distribution of radioactive sources to determine areas of steam penetration or areas where there is a lack of steam penetration in the geological formation.

18. An apparatus as claimed in claim 12 wherein the apparatus is operable in a background noise measurement mode, wherein in the background noise measurement mode the distributed fibre optic sensor interrogator unit is configured to perform distributed fibre optic sensing on the first optical fibre during a period when the electrical source is configured to operate such that the potential difference between the first and second electrodes is not sufficient to cause avalanche multiplication in response to an ionisation event so as to generate a background noise signal.

19. An apparatus as claimed in claim 12 further comprising a second sensing optical fibre which is spaced apart from the first and second electrodes so as to be substantially insensitive to any avalanche multiplication and wherein the apparatus is configured to perform distributed fibre optic sensing on the second optical fibre to provide a background noise signal.

20. An apparatus as claimed in claim 19 wherein said distributed fibre optic sensor interrogator unit is configured to perform distributed fibre optic sensing on both the first and second optical fibres.

21. An apparatus as claimed in claim 18 wherein the processor is configured to subtract the background noise signal from the first set of measurements.

22. A method of determining information about a geological formation subjected to steam injection, the method comprising:

accessing a first set of measurement signals, the first set of measurement signals having been acquired by performing distributed fibre optic sensing on a first optical fibre deployed in a borehole running through the geological formation and being indicative of disturbances acting on each of a plurality of longitudinal sensing portions of the first optical fibre;

wherein at least part of the first optical fibre was disposed adjacent to at least a first electrode spaced apart from a second electrode, with a gas between the first and second electrodes and wherein the potential difference between the first and second electrodes is such that an ionisation event within the gas results in an avalanche multiplication;

the method further comprising analysing the first set of measurement signals to determine a spatial distribution of radioactive sources throughout the geological formation.

* * * * *